United States Patent [19]
Rickman et al.

[11] Patent Number: 6,163,632
[45] Date of Patent: Dec. 19, 2000

[54] INTEGRATED OPTICAL CIRCUIT

[75] Inventors: Andrew George Rickman, Marlborough; Arnold Peter Roscoe Harpin, Oxford; Ralf-Dieter Pechstedt, Wantage; James Stuart McKenzie, Uxbridge, all of United Kingdom

[73] Assignee: Bookham Technology plc, Oxfordshire, United Kingdom

[21] Appl. No.: 09/158,795

[22] Filed: Sep. 23, 1998

[30] Foreign Application Priority Data

Sep. 23, 1997 [GB] United Kingdom .................. 9720085

[51] Int. Cl.[7] .................................... G02B 6/12
[52] U.S. Cl. ................ 385/14; 385/12; 385/49; 385/50; 356/350
[58] Field of Search .................... 385/12, 14, 2, 385/3, 8, 49, 50; 356/350

[56] References Cited

U.S. PATENT DOCUMENTS

| | | | |
|---|---|---|---|
| 4,787,691 | 11/1988 | Lorenzo et al. | 350/96.14 |
| 4,997,246 | 3/1991 | May et al. | 350/96.14 |
| 5,194,917 | 3/1993 | Regener | 356/350 |
| 5,757,986 | 5/1998 | Crampton et al. | 385/2 |
| 5,787,214 | 7/1998 | Harpin et al. | 385/49 |

FOREIGN PATENT DOCUMENTS

| | | |
|---|---|---|
| 0331332A2 | 9/1989 | European Pat. Off. . |
| 0538633A1 | 10/1991 | European Pat. Off. . |
| 2230616A | 10/1990 | United Kingdom . |
| 2265252A | 9/1993 | United Kingdom . |
| 2307786A | 6/1997 | United Kingdom . |
| WO91/15797 | 10/1991 | WIPO . |
| WO97/42534 | 11/1997 | WIPO . |

OTHER PUBLICATIONS

A. G. Rickman, et al.: "Silicon–on–insulator, optical rib waveguides: loss, mode characteristics, bends and y–junctions", IEE Proceedings: Optoelectronics, vol. 141, No. 6, Dec. 1, 1994, pp. 391–393.
International Search Report for PCT/GB98/02871(1 page).
Great Britain Patent Office Search Report for GB 9720085.1, Jan. 27, 1998 (2 pages).

*Primary Examiner*—Phan T. H. Palmer
*Attorney, Agent, or Firm*—Fleshner & Kim, LLP

[57] ABSTRACT

An integrated optical circuit for use in a fibre optic gyroscope which senses rotation rates by determining a phase shift due to the Sagnac Effect between light beams travelling around an optical fibre sensing loop (4) in opposite directions, the circuit being provided on a silicon-on-insulator chip comprising a layer of silicon separated from a substrate by an insulating layer, the circuit comprising: rib waveguides (11) formed in the silicon layer for receiving light from a light source (2) and transmitting light to a light detector (3), fibre optic connectors (9) in the form of grooves etched in the silicon layer for receiving the respective ends of the optical fibre sensing loop (4); rib waveguides (11) formed in the silicon layer for transmitting light to and from said fibre optic connectors (9) so as to direct light beams in opposite directions around the sensing loop (4) and receive light beams returning therefrom, phase determining means and (13,17,31) integrated in silicon layer for determining a phase shift between the light beams returning from the sensing loop (4).

24 Claims, 5 Drawing Sheets

INTEGRATED OPTICAL CIRCUIT

TECHNICAL FIELD

This invention relates to an integrated optical circuit for use in a fibre optic gyroscope.

BACKGROUND ART

Fibre optic gyroscopes for measuring rotation rates based on the Sagnac effect are known. When light traverses an optic fibre loop which is rotating about an axis perpendicular to its plane, the optical transmit time of the light varies in dependence on the loop's rotation rate. For two optical signals traversing the loop in opposite directions the Sagnac phase difference between them is proportional to the rotation rate.

Integrated optical circuits for use with such fibre optic gyroscopes have been proposed, for example, in U.S. Pat. No. 5,194,917. However, the design of these has been such as to include non-silicon passive functional elements. This adds extra complexity and expense to the manufacturing process due to extra alignment and fabrication stages required to try to avoid or minimise problems due to material mis-match and/or coupling losses.

The present invention seeks to avoid or reduce these difficulties experienced with the prior art.

DISCLOSURE OF INVENTION

According to a first aspect of the invention, there is provided an integrated optical circuit for use in a fibre optic gyroscope which senses rotation rates by determining a phase shift due to the Sagnac Effect between light beams travelling around an optical fibre sensing loop in opposite directions, the circuit being provided on a silicon-on-insulator chip comprising a layer of silicon separated from a substrate by an insulating layer, the circuit comprising: rib waveguides formed in the silicon layer for receiving light from a light source and transmitting light to a light detector, fibre optic connectors in the form of grooves etched in the silicon layer for receiving the respective ends of the optical fibre sensing loop; rib waveguides formed in the silicon layer for transmitting light to and from said fibre optic connectors so as to direct light beams in opposite directions around the sensing loop and receive light beams returning therefrom, and phase determining means integrated in the silicon layer for determining a phase shift between the light beams returning from the sensing loop.

According to another aspect of the invention there is provided a fibre optic gyroscope comprising such an integrated optical circuit.

Other preferred and optional features of the invention will be apparent from the following description and the subsidiary claims of the specification.

It should be noted that rib waveguides are sometimes known as ridge waveguides, the two terms being interchangeable.

BRIEF DESCRIPTION OF DRAWINGS

The invention will now be further described, merely by way of example, with reference to the accompanying drawings, in which.

BEST MODE OF CARRYING OUT THE INVENTION

Figure 1:
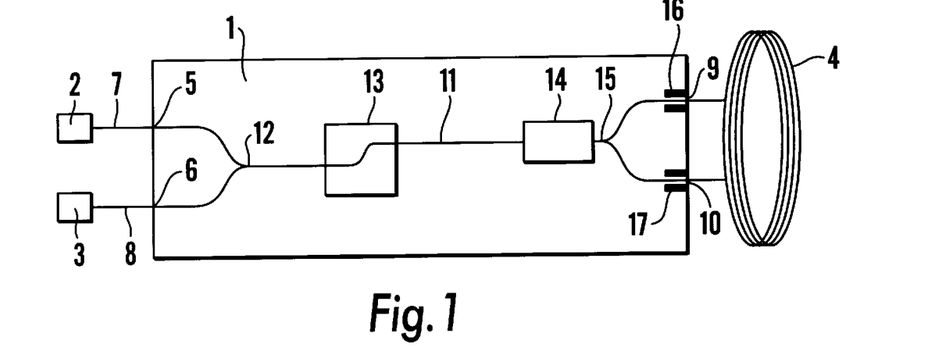
FIG. 1 is a schematic diagram of a fibre optic gyroscope incorporating an integrated optical circuit according to a first embodiment of the invention.

The fibre optic gyroscope illustrated in FIG. 1 comprises an integrated optical circuit, fabricated on a silicon-on-insulator chip 1. This comprises an upper layer of silicon separated from an underlying layer of silicon, by an insulating layer, such as silicon dioxide. Such a substrate preferably comprises an upper layer of silicon 3 to 15 microns thick separated from the underlying silicon layer by a layer of silicon dioxide at least 0.1 microns thick and preferably at least 0.3 microns thick. Such substrates are readily commercially available. References in the following description to the silicon layer refer to the upper layer described above.

The integrated optical circuit 1 connects together a light source 2, a light detector 3, and an optical fibre loop 4, which forms the sensing element of the gyroscope.

The integrated optical circuit 1 comprises first and second fibre connectors 5 and 6 for receiving optical fibres 7 and 8 transmitting light to and from the light detector 3 and the source 2. The fibre connectors 5 and 6 comprise grooves, typically V-grooves, formed in the silicon layer.

Further fibre connectors 9 and 10 are provided for receiving the ends of the fibre optic loop 4. Rib waveguides 11 are formed in the silicon layer of the chip to optically connect the fibre connectors 5, 6, 9 and 10, the rib waveguides from the connectors 5 and 6 joining at a first Y-junction 12, and passing through a spatial filter 13 and a polarizer 14 before dividing at a second Y-junction 15. The waveguides extending from the second Y-junction 15 pass through phase modulators 16 and 17 and then to the connectors 9 and 10. The Y-junction 15 thus serves to direct light in both directions around the sensing coil 4 and the re-combine the counter propagating light received back on the chip 1. The waveguides 11 may be tapered at the waveguide-optical fibre connections to provide mode matching and good optical power coupling. Details of a suitable form of taper are provided in the applicants' co-pending application U.S. Ser. No. 09/019732.

The integrated optical circuit shown in FIG. 1 has a number of advantages over the prior art. Most importantly, the rib waveguides 11, the fibre connectors 5, 6, 9 and 10, and the phase modulators 16 and 17 are all constructed in the same silicon layer. This greatly simplifies fabrication of the circuit, enables further components such as light sources, light detectors and fibres to be passively aligned with the rib waveguides 11 and avoids potential problems associated with the change of material, and hence the refractive index, at the interfaces between the waveguides and other monolithically integrated components as experienced in the prior art.

U.S. Pat. No. 5,194,917, for instance, uses phosphorous or germanium doped $SiO_2$ or $Si_3N_4$ waveguides deposited on a silicon substrate and uses a modulator fabricated from germanium which is diffused into or epitaxially grown on a silicon substrate or fabricated from a silicon germanium mixed crystal so giving rise to potential coupling losses between the functional elements of the circuit.

In addition, the use of a silicon-on-insulator substrate enables the fibre connectors to be fabricated in accordance with the applicants' co-pending application U.S. Ser. No. 08/643476 now U.S. Pat. No. 5,787,214 in which the rib waveguide is constructed to overhang the end of the V-groove to facilitate butt coupling of the waveguide with an optical fibre positioned within the V-groove.

The rib waveguides 11 and fibre connectors 5, 6, 9 and 10 used in the present invention are also self-aligned to the crystallographic planes of the silicon layer and their relative positions can be determined by a single photolithographic step during fabrication of the circuit.

The waveguides and V-grooves disclosed in U.S. Pat. No. 5,194,917 would be formed in separate steps as the waveguides are deposited on the substrate rather than being formed from the substrate itself. A more complex manufacturing process is thus involved with increased alignment difficulties.

The phase modulators used in the present invention for signal interrogation may comprise a p-i-n diode formed across a rib waveguide such as, for example, disclosed in the applicants' co-pending patent U.S. Pat. No. 5,757,986, in which doped regions are provided on either side or alongside the silicon rib waveguide. An electrical signal applied across the diode causes free charge carriers to be injected into the rib waveguide and so alter its effective refractive index. There is no material mis-match between the waveguides 11 and such modulators so coupling losses therebetween are avoided. In contrast, in the circuit described in U.S. Pat. No. 5,194,917 there is a material mis-match between the modulator and the $SiO_2$ and $Si_3N_4$ based waveguides which adds complexity to the fabrication of the circuits and may lead to losses due to the refractive index step therebetween. Furthermore, p-i-n modulators of the type described above are capable of modulation up to many MHz which is more than adequate for gyroscope demodulation schemes for both open and closed loop systems. Thermal modulators may also be used in place of the p-i-n diodes referred to above. Thermal modulators show no or much reduced amplitude modulation in comparison to p-i-n diodes. Spurious amplitude modulation generated in the phase modulators affects the bias stability and can modify the scale factor of a gyroscope. The common way to reduce the effect on the bias stability is to operate the phase modulator at the eigenfrequency of the fibre optic loop 4 equal to 1/(2× transit time through the loop). Generally, thermal phase modulators have a lower bandwidth compared to p-i-n diode modulators, but in the case of a highly sensitive gyroscope which employs a long fibre optic loop, they can be operated at the loop eigenfrequency. Hence, by using thermal modulators at the loop eigenfrequency, any residual effects on bias and scale factor stability can be reduced even further. This is most important in a highly sensitive gyroscope, for which the thermal modulator is thus preferred.

Thermal modulators may be formed in a rib waveguide by providing heating and/or cooling means to control the temperature of the waveguide. This may, for instance, be done using an electrical resistance heater circuit provided on or adjacent the waveguide or by providing n and p doped regions between two rib waveguides and passing a current through the doped regions via conductive tracks on the waveguides so that one rib waveguide is cooled and the other heated according to the principles of the Peltier effect due to the junctions between dissimilar materials (the p and n-doped regions) thus formed adjacent the respective waveguides. Such an arrangement is further described in the applicant's co-pending patent application GB9809458.4.

Thermal modulators may also be provided by forming a n-i-n or a p-i-p device across a waveguide in a similar manner to the p-i-n diode referred to above but with both areas n-doped or both areas are p-doped. Such a device acts as an electrical resistance heater so current passed through between the doped regions heats the waveguide. Such an arrangement is described in the applicant's co-pending application No. GB9815655.7.

A phase modulator is preferably provided in each of the waveguides leading to the respective ends of the optical fibre sensing loop although in some arrangements only a single phase modulator is required.

The polarizer 14 is also preferably integrated on the chip 1 and may also be based on a silicon rib waveguide structure, e.g. by modifying the dielectric cladding (e.g. usually silicon dioxide) and replacing part of it with a buffer layer of high refractive index and a metal coating such as aluminium. A suitable form of polariser is disclosed in the applicants' co-pending patent application Ser. No. 09/111888. The ability to integrate the polarizer on the chip provides a further significant advantage over the prior art. However, other forms of polarizing means may be used to polarize the light transmitted to the sensing loop.

In addition to the above, confinement of light in silicon rib waveguides formed on a silicon-on-insulator substrate is much better than with $SiO_2$ or $Si_3N_4$ based waveguides due to their high refractive index and their compatability with light of 1300 nm or 1550 nm wavelength (these being optimum wavelengths for operation of a fibre optic gyroscope) so the amount of stray light in the substrate is reduced, providing an improved signal to noise ratio and reduced signal drift.

The spatial filter 13 is provided to help reduce the effect of stray light in the substrate associated with the Y-junction 12, which could couple into the waveguide. The degree of spatial filtering required will depend on the amount of stray light (e.g. produced by scattering at interfaces, by Y-junctions and, to a lesser extent, by couplers) and will depend on the requirements of the application.

Figure 2:
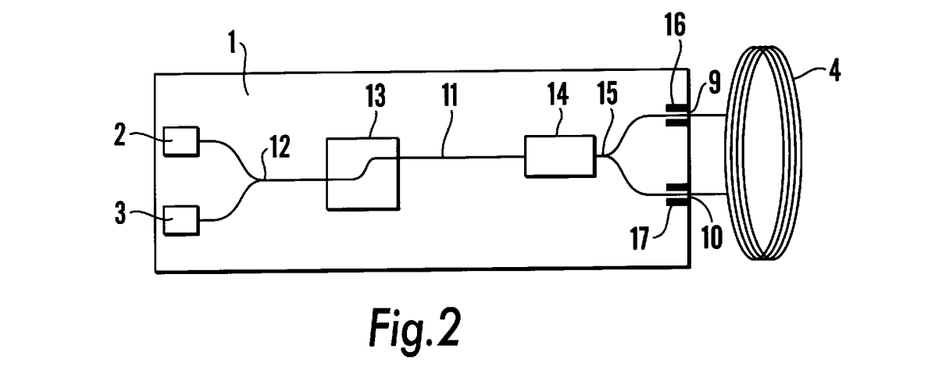
FIG. 2 is a schematic diagram of a fibre optic gyroscope incorporating an integrated optical circuit according to a second embodiment of the invention.

The spatial filter may be in the form of a curved section of a rib waveguide (as shown in FIGS. 1 and 2) or may be formed by a sharp 90 degree bend or may be provided by other means, e.g. the provision of one or more mirrors. The spatial filter is preferably also integrated on the chip.

FIG. 2 shows an arrangement similar to that of FIG. 1 except that the light source and light detector 2 and 3 are provided on the silicon-on-insulator chip rather than being mounted off-chip.

The light source 2 typically comprises a laser diode integrated on the chip 1. The light source 2 may be passively aligned with the waveguide leading thereto by mounting it in a location recess formed in the silicon layer. The positions of the location recess and of the waveguide can be determined by a single lithographic step during fabrication of the chip so they are automatically aligned with each other. Location of the laser diode in the direction perpendicular to the face of the chip may also be determined by the position of an interface of the insulating layer in the silicon-on-insulator chip which provides a natural etch stop. Further details of the alignment of a laser diode with a rib waveguide are given in the applicants' U.S. patent application Ser. No. 08/853104 now U.S. Pat. No. 5,881,190. Superluminescent diodes (SLDs) and edge light emitting diodes (ELEDs) may also be used as the light source 2.

The light detector 3 typically comprises a photodiode. This may be integrated on the chip and located thereon in a similar manner to the laser diode as described above. Alternatively, it may be mounted over a recess in the silicon layer and an angled facet provided in the recess to re-direct light from the waveguide to the photodiode. Alignment between the facet and the waveguide can, again, be achieved automatically as they are formed in the same silicon layer and their positions determined by a single lithographic step. Further details of this are given in the applicants' U.S. patent application Ser. No. 09/019729.

These alignment techniques help reduce coupling losses and simplify the manufacturing process so making it quicker and less expensive.

In contrast to the above, in prior art such as U.S. Pat. No. 5,194,917, which is not based on a silicon-on-insulator substrate and does not use silicon rib waveguides formed therein, the nature of the materials and structure employed does not provide any self-alignment mechanism. The use of a silicon-on-insulator substrate also facilitates the fabrication of overhanging portions of the waveguide in the fibre connectors as described above.

Figure 3:
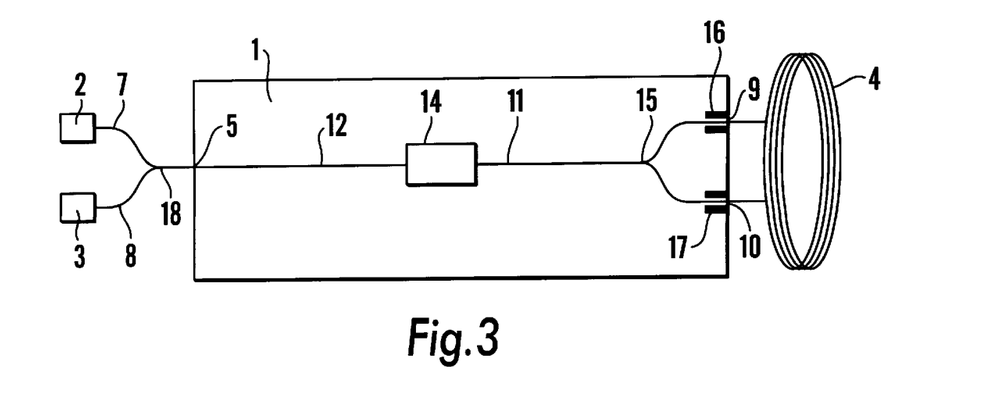
FIG. 3 is a schematic diagram of a fibre optic gyroscope incorporating an integrated optical circuit according to a third embodiment of the invention.

FIG. 3 shows an arrangement similar to FIG. 1 but with a fibre coupler 18 of conventional design provided off-chip in place of the Y-junction 12. In this case, the requirement for spatial filtering on the chip is reduced.

Figure 4A:
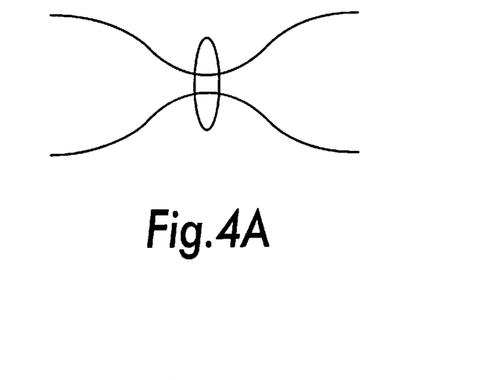
FIGS. 4A and 4B are schematic diagrams of alternative forms of coupler which can be used in the circuits shown in FIGS. 1 to 3.
Figure 4B:
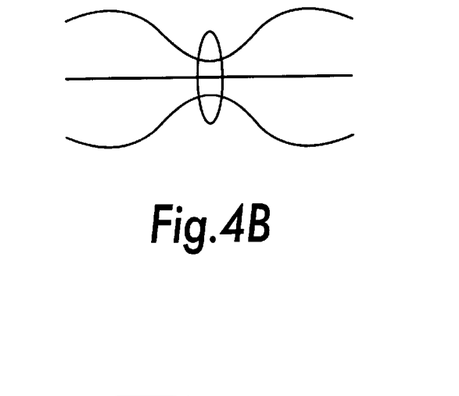

Directional couplers may be used in the circuits described above in place of the Y-junctions. FIG. 4A shows a 2×2 coupler and FIG. 4B a 3×3 coupler. These couplers are of conventional design and comprise rib waveguides which are positioned close to each other so that a light wave travelling in one waveguide overlaps with the other waveguides and is thus coupled therewith. The loop shown in the Figures represents the coupling region.

Other types of Y-junction or couplers may also be used (with spatial filters when necessary).

The couplers and the phase modulators may also be replaced by a multi-mode interference coupler as described below in relation to FIGS. 11 and 12.

Figure 5:
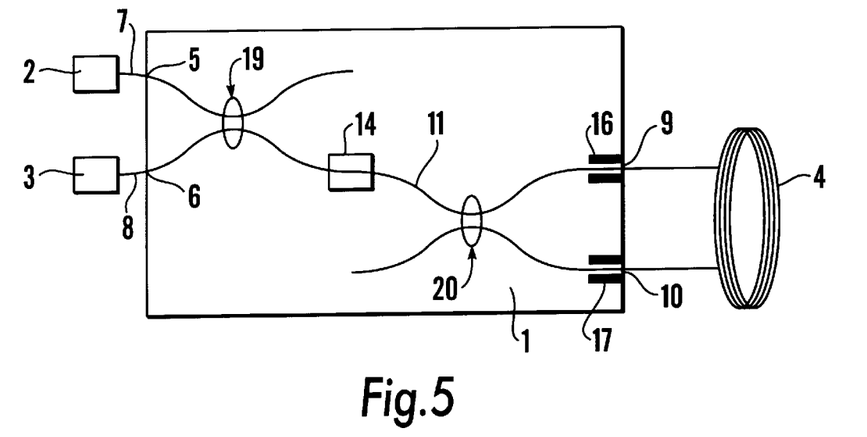
FIGS. 5, 6, 7 and 8 are schematic diagrams of fibre optic gyroscopes incorporating integrated optical circuits having couplers such as those shown in FIG. 4.

FIG. 5 shows an arrangement similar to that of FIG. 1 but with the first Y-junction replaced by a first 2×2 coupler 19 and the second Y-junction replaced by a second 2×2 coupler 20. As the couplers reduce the amount of stray light compared to a Y-junction, the requirement for spatial filtering is again reduced.

Figure 6:
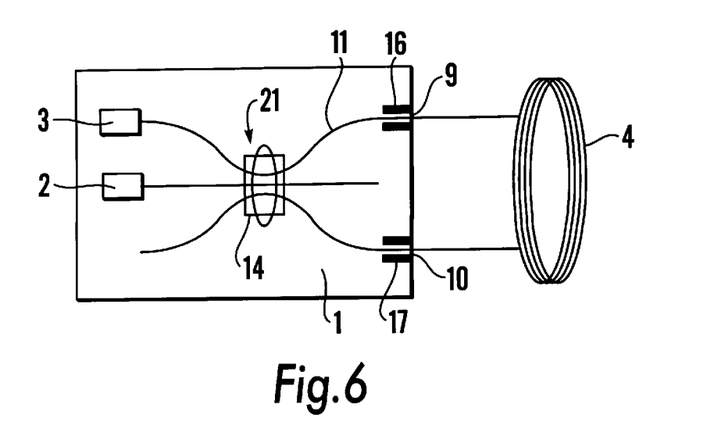

FIG. 6 shows an arrangement similar to that of FIG. 2 but with the Y-junctions replaced by a 3×3 coupler 21. A polarizer 14 is shown represented by a rectangle over the coupler 21. The polarizer 14 lies within the coupling region and covers all the waveguides in the coupling region.

Multiplexing of the light source 2 to a plurality of optical fibre sensing loops can also be achieved with an appropriate arrangement of Y-junctions, couplers, spatial filters and polarizers as necessary as described below.

Figure 7:
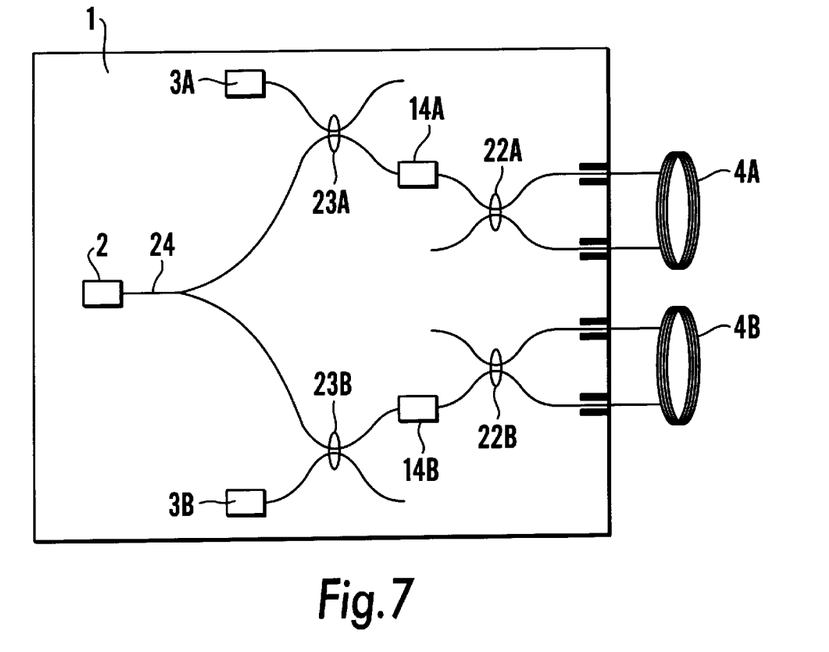

FIG. 7 shows a two coil arrangement for sensing the rotation rate about two axes. Four 2×2 couplers 22A, 22B, 23A and 23B and a Y-junction 24 are used to connect a light source 2, two detectors 3A and 3B and two sensing coils 4A and 4B. Polarizers 14A and 14B are also provided between the couplers 22A and 23A and between couplers 22B and 23B as shown.

Figure 8:
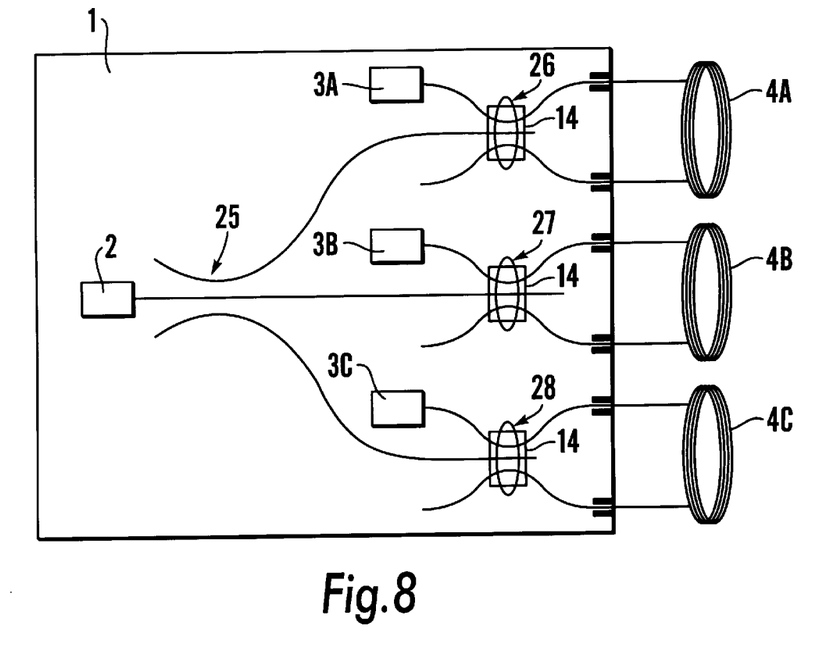

FIG. 8 shows a three coil arrangement for sensing the rotation rate about three axes. Four 3×3 couplers 25, 26, 27 and 28 are used to connect a light source 2, three detectors 3A, 3B and 3C and three sensing coils 4A, 4B and 4C. Polarizers 14 are again provided within each of the coupling regions as described above.

It should be noted that the position of the polarizers 14 may be varied in FIGS. 6, 7 and 8 so long as a polarizer is provided between the light source and each sensing coil 4 and between each sensing coil 4 and each detector 3. The order of the polarizer 14 and spatial filter 13 is also immaterial.

Figure 9:
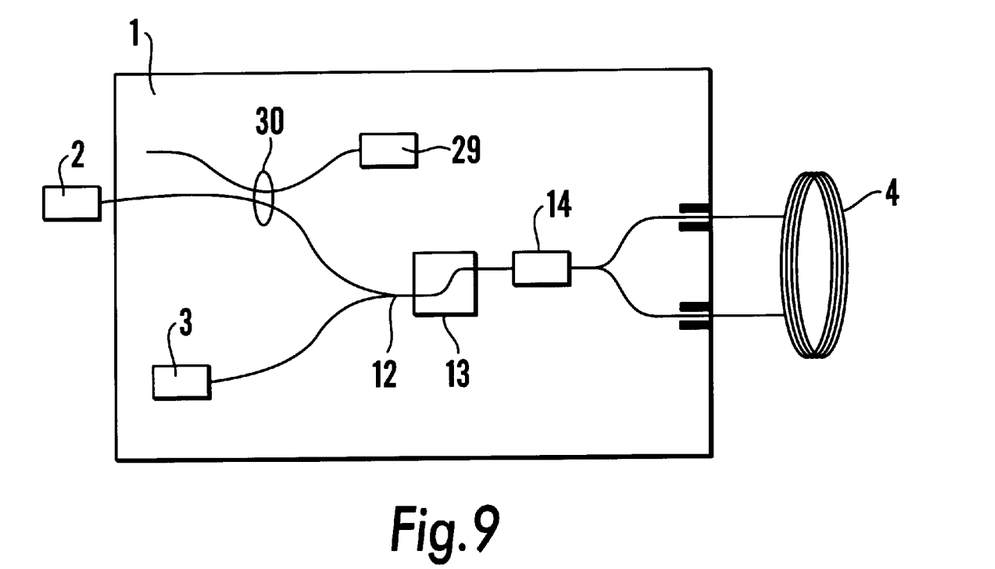
FIG. 9 is a schematic diagram of a fibre optic gyroscope incorporating an integrated optical circuit according to a fourth embodiment of the invention.

FIG. 9 shows a further embodiment in which the light source 2 is provided off-chip (as in FIG. 1) and the light detector 3 is provided on the chip 1 (as in FIG. 2). In addition, a further light detector 29 is provided on the chip 1 to monitor the power output of the light source 2, the light detector 29 being a photodiode and coupled with the waveguide leading to the light source 2 by a 2×2 coupler 30. A spatial filter 13 and polarizer 14 are also provided as in FIGS. 1 and 2. A similar arrangement could also be provided in FIGS. 6, 7 and 8, i.e. the light source 2 in the embodiments shown in FIGS. 6, 7 and 8 may also be mounted off-chip instead of being on the chip.

Figure 10:
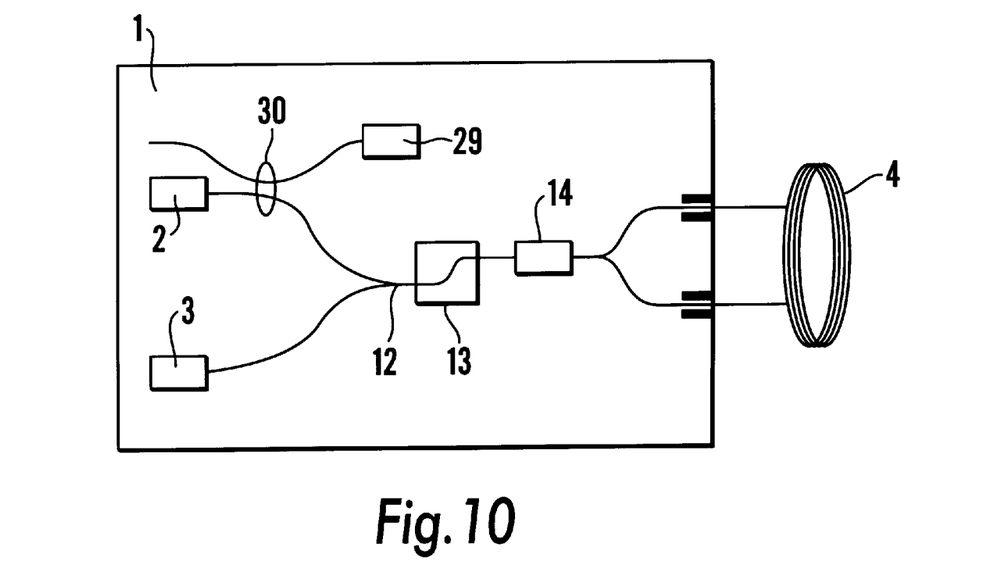
FIG. 10 is a schematic diagram of a fibre optic gyroscope incorporating an integrated optical circuit according to a fifth embodiment of the invention.

FIG. 10 shows another embodiment which is similar to that of FIG. 3 but with both the light source 2 and light detector 3 provided on the chip (as in FIGS. 2 and 6).

Figure 11:
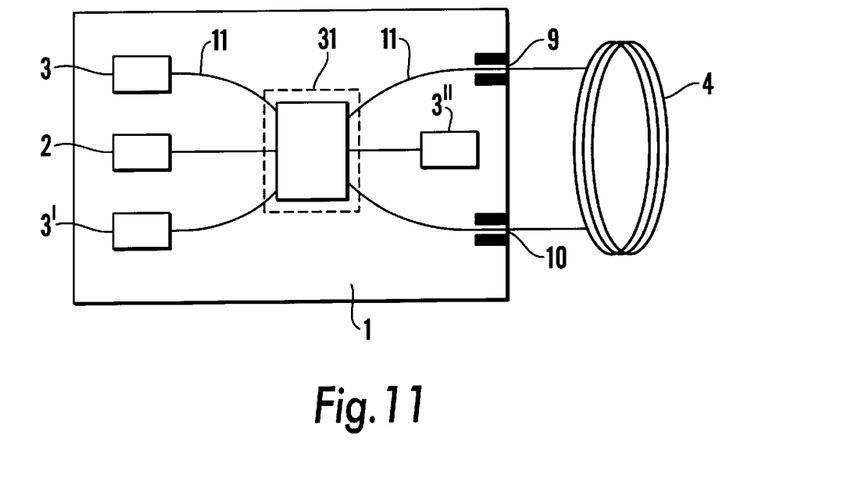
FIG. 11 is a schematic diagram of a fibre optic gyroscope incorporating an integrated optical circuit according to a sixth embodiment of the invention.
Figure 12:
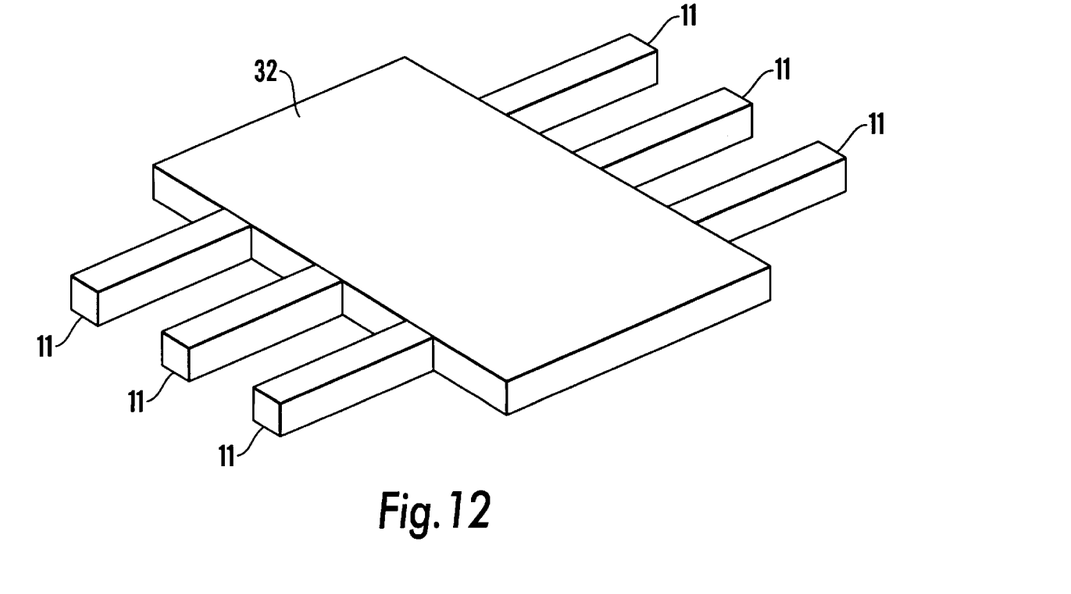
FIG. 12 is a perspective view of a preferred form of multi-mode interference coupler used in the sixth embodiment.

FIG. 11 shows a further embodiment in which the couplers described above are replaced by a multi-mode interference (MMI) coupler 31. As shown in FIG. 12, this may be integrated in the silicon layer and comprises a multi-mode section 32 formed in the silicon layer with input and output rib waveguides 11 connected thereto. MMI couplers are based on a self-imaging principle, employing a section of highly multimoded planar waveguide between input and outupt waveguides. They benefit from reduced production tolerances, are substantially polarisation insensitive, provide stable phase relationships between input and output ports due to the nature of their operation and are compatible with the rib waveguides of the type described above.

In the arrangement shown in FIG. 11, the MMI coupler 31 has one port connected to receive light from a light source 2, three ports connected to transmit light to light detectors 3, 3' and 3", and two ports each connected to transmit light to and receive light from a respective end of the optical fibre loop 4.

An additional advantage of an MMI coupler is that it can be designed to provide a stable ±120° phase shift between the light beams travelling around the fibre optic loop 4 in opposite directions. By connecting the ports as shown in FIG. 11, the phase shifts at the detector ports 3 and 3' are given by $\Delta\Phi=\Phi_{ccw}-\Phi_{cw}=240°$ and $\Delta\Phi=\Phi_{ccw}-\Phi_{cw}=120°$, respectively. This leads to a signal $I_1=1+\cos(\Delta\Phi_R-120°)$ and $I_3=1+\cos(\Delta\Phi_R+120°)$ at the detectors 3' and detector 3, respectively, where $\Delta\Phi_R$ denotes the Sagnac phase shift which is proportional to the rotation rate and $\Phi_{cw}$ and $\Phi_{ccw}$ are the phases of the beam travelling clockwise and counter-clockwise, respectively. Hence, the 3×3 MMI simulates the action of an ordinary 3×3 fused fibre coupler when used in a gyroscope circuit. An optional light detector 3" can be employed as shown for power monitoring purposes. The two outputs $I_1$ and $I_3$ can be used directly to extract the Sagnac phase shift, avoiding the need to provide active phase modulators on the chip. By using a polarisation insensitive 3×3 MMI coupler in the described way, spurious phase drifts commonly occurring in gyros employing a 3×3 fibre coupler caused by random polarisation changes in the fibre coil can be significantly reduced, leading to a better performance of a passive and hence, low-cost gyroscope.

The arrangement shown in FIG. 11 may be used without polarising means but a more sensitive gyroscope can be provided if polarisers (not shown) are provided so that light transmitted round the optical fibre loop in opposite directions has the same polarisation in which case polarisation maintaining fibre is preferably used.

It will be appreciated that the use of a silicon-on-insulator substrate allows all the components of the gyroscope (except for the light source and light detector) to be monolithically integrated in the silicon layer so reducing the number of interfaces in the circuit. Thus, optical power coupling losses due to refractive index steps with changes in waveguide material are avoided or eliminated. The light source and light detector may be hybridised on the chip and the nature of the silicon-on-insulator substrate also allows for the self-alignment of optical sources and detectors and for self-alignment of optical fibres to the rib waveguides as described above. These features of the integrated circuit described thus provide significant advantages over the prior art.

In addition, the use of silicon waveguides incorporated in a silicon-on-insulator substrate allow the integrated circuit to be made significantly more compact than the prior art. A fibre optic gyroscope having an integrated optical circuit on a silicon-on-insulator substrate may typically be from 3 mm×20 mm for a single coil arrangement to 7 mm×20 mm for a three coil arrangement which is considerably smaller than can be achieved with the prior art. This improves the cost-effectiveness of production as well as reducing the size of the device.

The integrated optical circuits described above thus enable fibre optic gyroscopes to be provided which are relatively inexpensive to manufacture.

What is claimed is:

1. An integrated optical circuit for use in a fibre optic gyroscope which senses rotation rates by determining a phase shift due to the Sagnac Effect between light beams travelling around an optical fibre sensing loop in opposite directions, the circuit being provided on a silicon-on-insulator chip comprising a layer of silicon separated from a substrate by an insulating layer, the circuit comprising: rib waveguides formed in the silicon layer for receiving light from a light source and transmitting light to a light detector, fibre optic connectors in the form of grooves etched in the silicon layer for receiving the respective ends of the optical fibre sensing loop; rib waveguides formed in the silicon layer for transmitting light to and from said fibre optic connectors so as to direct light beams in opposite directions around the sensing loop and receive light beams returning therefrom, and phase determining means integrated in the silicon layer for determining a phase shift between the light beams returning from the sensing loop.

2. An integrated optical circuit as claimed in claim 1 in which the phase determining means comprises at least one phase modulator for altering the phase of at least one light beam returning from the sensing loop.

3. An integrated optical circuit as claimed in claim 2 in which a phase modulator is provided in each of the rib waveguides leading to the fibre optic connectors which receive the respective ends of the sensing loop.

4. An integrated optical circuit as claimed in claim 1 comprises polarising means for polarising light transmitted around the sensing loop.

5. An integrated optical circuit as claimed in claim 4 in which the polarising means is integrated on the chip.

6. An integrated optical circuit as claimed in claim 5 in which the polarising means comprises a portion of a rib waveguide having a buffer layer and a metal coating provided thereon.

7. An integrated optical circuit as claimed in claim 1 in which the light source is integrated on the chip.

8. An integrated optical circuit as claimed in claim 7 in which the light source is mounted in a location recess formed in the silicon layer in alignment with a rib waveguide.

9. An integrated optical circuit as claimed in claim 1 in which the light detector is integrated on the chip.

10. An integrated optical circuit as claimed in claim 9 in which the light detector is mounted in a location recess formed in the silicon layer in alignment with a rib waveguide.

11. An integrated optical circuit as claimed in claim 9 in which the light detector is mounted over a recess in the silicon layer and an angled facet is provided in the recess to re-direct light from a rib waveguide to the light detector.

12. An integrated optical circuit as claimed in claim 11 in which the rib waveguides include couplers for dividing and/or combining light travelling therein.

13. An integrated optical circuit as claimed in claim 1 in which the silicon-on-insulator chip comprises a layer of silicon 3–15 microns thick separated from a silicon substrate by a layer of silicon dioxide at least 0.1 microns thick.

14. An integrated optical circuit as claimed in claim 1 connected to one or more optical fibre sensing loops and having a light source and a light detector so as to form a fibre optic gyroscope.

15. An integrated optical circuit as claimed in claim 1, wherein the phase determining means comprises a silicon p-i-n diode.

16. An integrated optical circuit as claimed in claim 1 in which the fibre optic connectors comprise V-grooves etched in the silicon layer and the waveguides overhang the end of the V-groove to facilitate butt coupling of the waveguide with an optical fibre positioned with the V-groove.

17. An integrated optical circuit as claimed in claim 1 which is arranged to multiplex a plurality of optical fibre sensing loops to a single light source.

18. An integrated optical circuit as claimed in claim 1 in which the phase determining means comprises a multi-mode interference coupler.

19. An integrated optical circuit as claimed in claim 18 in which the multi-mode interface coupler has a port connected to receive light from the light source, at least two ports connected to light detectors and two ports each connected to transmit light to and receive light from a respective end of the sensing loop.

20. An integrated optical circuit as claimed in claim 19 in which the coupler provides a phase shift of 120 degrees between light beams transmitted in opposite directions around the sensing loop.

21. An integrated optical circuit as claimed in claim 18 in which the multi-mode interference coupler is polarisation insensitive.

22. An integrated optical circuit for use in a fibre optic gyroscope which senses rotation rates by determining a phase shift due to the Sagnac Effect between light beams travelling around an optical fibre sensing loop in opposite directions, the circuit being provided on a silicon-on-insulator chip comprising a layer of silicon separated from a substrate by an insulating layer, the circuit comprising: rib waveguides formed in the silicon layer for receiving light from a light source and transmitting light to a light detector, fibre optic connectors in the form of grooves etched in the silicon layer for receiving the respective ends of the optical fibre sensing loop; rib waveguides formed in the silicon layer for transmitting light to and from said fibre optic connectors so as to direct light beams in opposite directions around the sensing loop and receive light beams returning therefrom, phase determining means integrated in the silicon layer for determining a phase shift between the light beams returning from the sensing loop, and a spatial filter integrated on the chip.

23. An integrated optical circuit as claimed in claim 22 in which the spatial filter comprises a curved portion of a rib waveguide.

24. An integrated optical circuit as claimed in claim 22 in which the spatial filter comprises one or more mirrors.

* * * * *